United States Patent
Wahl et al.

(10) Patent No.: US 12,089,122 B2
(45) Date of Patent: Sep. 10, 2024

(54) ULTRA-WIDEBAND INDOOR LOCATION SYSTEM AND METHOD

(71) Applicant: Be Spoon, Le Bourget du Lac (FR)

(72) Inventors: Eberhard Wahl, Weilheim an der Teck (DE); Daniel Bossert, Nussdorf (DE); Pascal Fabre, Chambery (FR)

(73) Assignee: Be Spoon, Le Bourget du Lac (FR)

( * ) Notice: Subject to any disclaimer, the term of this patent is extended or adjusted under 35 U.S.C. 154(b) by 264 days.

(21) Appl. No.: 17/604,924

(22) PCT Filed: Oct. 22, 2019

(86) PCT No.: PCT/IB2019/001211
§ 371 (c)(1),
(2) Date: Oct. 19, 2021

(87) PCT Pub. No.: WO2020/212723
PCT Pub. Date: Oct. 22, 2020

(65) Prior Publication Data
US 2022/0210620 A1    Jun. 30, 2022

(30) Foreign Application Priority Data
Apr. 19, 2019   (WO) .................. PCT/IB2019/000745

(51) Int. Cl.
*H04W 4/33*   (2018.01)
*G01S 1/04*   (2006.01)
(Continued)

(52) U.S. Cl.
CPC ............. *H04W 4/33* (2018.02); *G01S 1/0428* (2019.08); *G01S 1/24* (2013.01); *G01S 5/021* (2013.01);
(Continued)

(58) Field of Classification Search
None
See application file for complete search history.

(56) References Cited

U.S. PATENT DOCUMENTS

| 7,479,884 | B1 | 1/2009 | Fullerton |
| 7,492,316 | B1 | 2/2009 | Ameti et al. |

(Continued)

FOREIGN PATENT DOCUMENTS

| CN | 101335587 A | 12/2008 |
| CN | 106324561 A | 1/2017 |

(Continued)

OTHER PUBLICATIONS

"ZigBee Wireless Sensor Network and its Applications in Internet of Things," downloaded on Jun. 6, 2024, 17 pages.
(Continued)

*Primary Examiner* — Frantz Bataille
(74) *Attorney, Agent, or Firm* — Slater Matsil, LLP (57) ABSTRACT

In an embodiment an ultra-wideband indoor real-time location system for determining positions of mobile tag devices within a localizing area includes a plurality of UWB signal transmitters located at preset positions and defining the localizing area, wherein the UWB signal transmitters are configured to operate with synchronized clocks and transmit UWB signals based on a UWB frame format, and wherein the UWB frame format includes unique information content for the UWB signal transmitter and at least one mobile tag device comprising a signal reception unit configured to receive the UWB signals, a time detection unit configured to derive respective arrival time points for the received UWB signals, an identification unit configured to derive the unique information content from the received UWB signals and a control unit configured to process the unique information content and the arrival time points for at least a subset of the UWB signal transmitters in a localizing algorithm to derive (Continued)

a position of the mobile tag device with respect to the subset of the UWB signal transmitters.

20 Claims, 5 Drawing Sheets

(51) Int. Cl.
| | |
|---|---|
| *G01S 1/24* | (2006.01) |
| *G01S 5/02* | (2010.01) |
| *G01S 13/02* | (2006.01) |
| *H04B 1/7163* | (2011.01) |
| *H04B 1/7183* | (2011.01) |
| *H04B 7/15* | (2006.01) |
| *H04W 4/02* | (2018.01) |
| *H04W 56/00* | (2009.01) |

(52) U.S. Cl.
CPC ...... *G01S 13/0209* (2013.01); *H04B 1/71632* (2013.01); *H04B 1/7183* (2013.01); *H04B 7/15* (2013.01); *H04W 4/023* (2013.01); *H04W 4/025* (2013.01); *H04W 56/001* (2013.01); *H04B 2201/71636* (2013.01)

(56) References Cited

U.S. PATENT DOCUMENTS

| | | |
|---|---|---|
| 10,064,012 B1 | 8/2018 | Boston et al. |
| 11,201,981 B1 | 12/2021 | Suiter et al. |
| 2010/0277284 A1 | 11/2010 | Brown et al. |
| 2014/0111313 A1 | 4/2014 | Wild et al. |
| 2014/0266907 A1 | 9/2014 | Taylor, Jr. et al. |
| 2017/0128814 A1 | 5/2017 | Ianni et al. |
| 2017/0135063 A1 | 5/2017 | Bartov et al. |
| 2018/0088186 A1* | 3/2018 | Bhattacharyya ... G01R 33/0023 |
| 2019/0244309 A1* | 8/2019 | Ottnad ............... G06Q 50/04 |
| 2020/0041603 A1 | 2/2020 | Stephens et al. |
| 2020/0154246 A1 | 5/2020 | Ganz et al. |
| 2020/0201295 A1 | 6/2020 | Ottnad et al. |
| 2020/0201303 A1 | 6/2020 | Kiefer et al. |
| 2020/0208989 A1 | 7/2020 | Ottnad et al. |
| 2020/0218235 A1 | 7/2020 | Kiefer et al. |
| 2021/0105736 A1 | 4/2021 | Tancerel et al. |
| 2022/0210607 A1 | 6/2022 | Bollard |
| 2022/0276670 A1 | 9/2022 | Fabre |
| 2023/0063193 A1 | 3/2023 | Wahl |

FOREIGN PATENT DOCUMENTS

| | | |
|---|---|---|
| CN | 107371236 A | 11/2017 |
| CN | 107454670 A | 12/2017 |
| CN | 108351400 A | 7/2018 |
| DE | 102017120381 A1 | 3/2019 |
| JP | 2011145111 A | 7/2011 |
| KR | 101797231 B1 | 11/2017 |
| WO | 2009072089 A1 | 6/2009 |
| WO | 2014013667 A1 | 1/2014 |
| WO | 2015187991 A1 | 12/2015 |
| WO | 2016140792 A1 | 9/2016 |
| WO | 2018073421 A2 | 4/2018 |
| WO | 2018073422 A2 | 4/2018 |
| WO | 2018172721 A1 | 9/2018 |
| WO | 2019048149 A1 | 3/2019 |
| WO | 2019048151 A1 | 3/2019 |
| WO | 2019048152 A1 | 3/2019 |
| WO | 2019048153 A1 | 3/2019 |
| WO | 2019052742 A1 | 3/2019 |

OTHER PUBLICATIONS

Lu Jingyu et al., "Design of indoor positioning system for mobile robot based on ultra-wideband", English Abstract, Application of Electronic Technique, vol. 43, p. 25-28, 2017, Total Pages 04.

* cited by examiner

ULTRA-WIDEBAND INDOOR LOCATION SYSTEM AND METHOD

CROSS-REFERENCE TO RELATED APPLICATIONS

This application is a national stage application of International Application No. PCT/IB2019/001211, filed on Oct. 22, 2019, which claims priority to International Application No. PCT/IB2019/000745, filed on Apr. 19, 2019, which applications are hereby incorporated herein by reference.

TECHNICAL FIELD

The present disclosure relates generally to localizing a mobile tag device also called a "marker". Moreover, the present disclosure relates generally to implementing an ultra-wideband location system. Specifically, the present disclosure relates to (in particular indoor) ultra-wideband location methods and systems.

BACKGROUND

Knowing the indoor position of an object can be an essential functional requirement for applications such as industrial or commercial storage handling, fabricating in so called smart factories, or motion detection of physical gestures. For this purpose, indoor location systems are developed that provide position information with an accuracy down to several centimeters or millimeters.

Ultra-wideband (UWB) location systems use UWB signals to measure the distance between components of the UWB location systems specifically the mobile tag devices and stationary devices. Knowing distances of a mobile tag device to some stationary devices enables a determination of the position of the mobile tag device in two-dimensional (2D) or three-dimensional (3D) spaces. For example, in indoor environments, such UWB location systems can be used, for tracking workpieces, worktools, workers, packages, shopping carts etc. Aspects to be considered when operating a UWB location system include a localizing accuracy, a frequency at which the localizing can be repeated (also referred to as location rate), and the number of mobile tag devices that can be located with one UWB location system.

UWB location systems are usually based on well-defined emission time points of the UWB signals and a precise measurement of reception time points. Precise timings of the emission and reception of the UWB signals are required to allow measurements such as time-of-flight (ToF) measurements (also referred to as time-of-arrival (ToA) measurements) or time-difference-of-arrival (TDoA) measurements with a required accuracy.

Generally, a location system is based on a location rate frame format defining temporally the respective activities performed usually for one cycle of the location measurement. The international patent application PCT/FR2019/000057 filed on Apr. 19, 2019 by the present applicant discloses exemplary UWB location systems, location protocols, and underlying UWB frame formats defining UWB signals with respect to their content. The international patent application PCT/FR2019/000057 is incorporated herein by reference in its entirety, in particular those sections specifically identified below.

The tag devices may be formed and/or used as the tags or mobile units, for example, described in international patent application publication WO 2018/073421 A3 and the not yet published German patent application DE 10 2019 112 781.5. Therein, exemplary usage as well as preferred further embodiments and aspects of the mobile tag devices and their implementations in, e.g., manufacturing environments or within automated guided vehicles, are disclosed.

Thus, the present disclosure is directed, at least in part, to improving or overcoming one or more aspects of prior systems.

SUMMARY

Embodiments provide a real-time location system (RTLS) for determining positions of tag devices. The specific location system is tag device centric in the sense that the position of the tag device can be derived on board of the mobile tag device. Thus, the tag device does not need to emit UWB signals, for example, and can performs the location computation itself. In other words, the tag device is configured to be self-locating (in contrast to an, e.g., server centric approach performing the localization, e.g., at some main (stationary) location system).

Further embodiments provide an ultra-wideband indoor real-time location system for determining positions of mobile tag devices within a localizing area. The system includes a plurality of UWB signal transmitters located at preset positions and defining the localizing area, wherein the UWB signal transmitters operate with synchronized clocks and are configured to transmit UWB signals based on a UWB frame format, wherein the UWB frame format includes unique information content for the UWB signal transmitter locally/respectively emitting the UWB signals; and at least one mobile tag device that includes a signal reception unit configured to receive UWB signals, a time detection unit configured to derive respective arrival time points for the received UWB signals, an identification unit configured to derive the unique information content from the received UWB signals, and a control unit configured to process the unique information content and the arrival time points for at least a subset of UWB signal transmitters in a localizing algorithm to derive the position of the mobile tag device with respect to the subset of the UWB signal transmitters.

Yet further embodiments provide a real-time location method for determining positions of a mobile tag device. The method includes:

transmitting UWB signals using an exchange protocol based on a location rate frame format and a UWB frame format, wherein the location rate frame format includes a beacon section comprising a series of time slots associated to UWB signal transmitters of a plurality of UWB signal transmitters to ensure time synchronized transmission of the UWB signals from the UWB signal transmitters, and the UWB frame format includes an entry with unique information content for the UWB signal transmitter locally/respectively emitting the UWB signals;

receiving the UWB signals at a mobile tag device;

deriving respective arrival time points for the received UWB signals at the mobile tag device;

deriving the unique information content from the received UWB signals; and processing the unique information content and the arrival time points for at least a subset of the plurality of UWB signal transmitters in a localizing algorithm to derive the position of the mobile tag device with respect to at least the subset of the UWB signal transmitters.

In some embodiments of the location system, the control unit further may be configured to identify the positions of the UWB signal transmitters based on the unique information content, the unique information content including globally or locally unique position information and optionally encoding coordinates of the position of a respective UWB signal transmitter, the coordinates given with respect to a global reference or a local reference, and to provide the positions of the UWB signal transmitters as input values to the localizing algorithm.

In some embodiments of the location system, the control unit further may be configured to identify the positions of the UWB signal transmitters based on the unique information content, the unique information content encoding an identifier of a respective UWB signal transmitter, and based on a look-up-table, the look-up-table associating the encoded identifiers with coordinates of the positions of the UWB signal transmitters given with respect to a global reference or a local reference, and to provide the positions of the UWB signal transmitters as input values to the localizing algorithm In some embodiments, for a subset of UWB signal transmitter, the coordinates may be encoded with respect to the same global reference or the same local reference.

In some embodiments of the location system, the control unit further may have access to the local reference that is stored at a local memory of the mobile tag device and/or that is provided within the ultra-wideband indoor real-time location system to the mobile tag device when the mobile tag device enters a room or a hall or a portion of a building. The local reference may identify a room or hall or portion of a building and may optionally be given in global coordinates.

In some embodiments of the location system, the UWB signal transmitters may be configured to transmit the UWB signals at respective emission time points that are temporally preset with respect to each other and/or wherein timestamp information may be encoded within each UWB signal and represent a global time point of transmission. In addition or alternatively, the UWB signal transmitters may include a master beacon device and a plurality of beacon satellite devices. Clocks of the beacon satellite devices may be synchronized based on the emission of beacon frames, emitted by the master beacon device with a master time delay between two successive beacon frames.

In some embodiments of the location system, the beacon satellite devices may be configured to transmit successive beacon frames whereby the master time delay may be set between two neighboring of the successive beacon frames (BFs). The tag device may be configured to receive the successive beacon frames of the beacon satellite devices, and to determine the arrival time points for the frames emitted from the master beacon device and the beacon satellite devices. The control unit may be configured to determining distance values associated to the position of the tag device from the arrival time points and installation position data representing the position of the master beacon device and the plurality of beacon satellite devices.

In some embodiments of the location system, the tag device further may include:
- a tag clock defining a tag time that is specific for the respective tag device;
- a tag data storage unit configured to store therein a master time delay data of the real-time location system and position data sets for positions of a master beacon device and a plurality of beacon satellite devices of the real-time location system. The signal reception unit of the tag device further may be configured to receive beacon frames that were sent in accordance with a location protocol from at least a subgroup of the master beacon device and the beacon satellite devices, to select a pair of beacon frames of the master beacon device or optionally of one of the beacon satellite devices, to determine tag-specific reception time delay data between the beacon frames of the selected pair of beacon frames, and to determine time of arrivals for location frames sent from the subgroup of the master beacon device and the beacon satellite devices. The control unit of the tag device further may be configured to optionally calibrate the tag clock with respect to the master time by comparing the tag-specific reception time delay data and the master time delay data. The control unit of the tag device further may be configured to perform a time-difference-of-arrival analysis using the determined time points of arrivals and the position data sets associated with the respective subgroup of the master beacon device and the beacon satellite devices.

In some embodiments of the location system, the control unit of the tag device further may be configured to measure, in particular for the received beacon frames of the subgroup of the master beacon device and the beacon satellite devices, respective temporal shifts with respect to the time slot associated the respective master beacon device or beacon satellite devices (e. g., a time difference relative to the beginning of the respective time slot) based on the calibrated tag time of the calibrated tag clock.

In some embodiments of the location system, the tag device further may be configured to include in the time-difference-of-arrival analysis a time of arrival for a tag location frame sent by another tag device, for which the tag device received and stored in the tag data storage unit a position data set indicating a temporarily stationary position.

In some embodiments, the real-time location method may further include the step of encoding coordinates of the position of the UWB signal transmitter as unique information content in the UWB signal, the coordinates given with respect to a global reference or a local reference.

In some embodiments, the real-time location method may further include the steps of encoding an identifier of the respective UWB signal transmitter as unique information content in the UWB signal; and providing a look-up-table, wherein the look-up-table associating the encoded identifiers with coordinates of the positions of the UWB signal transmitters given with respect to a global reference or a local reference.

In some embodiments, the coordinates may be encoded with respect to a common global reference or a common local reference for a subset of UWB signal transmitters.

In some embodiments, the unique information content may be selected for providing position related information to the localizing algorithm and specifically for calculating time difference of arrival values under consideration of the point of origin of a received UWB signal.

To summarize the concepts disclosed herein, a regular broadcasting of UWB signals can be continuously performed based on a plurality of (spatially) fix installed stationary units (such as transmitters or transceivers that are fix in their position). Those stationary units send UWB signals which are synchronized in time, e.g., represent a synchronized timestamp as described in the above-mentioned international patent application PCT/FR2019/000057. Mobile tag devices receive the UWB signals and measure the time of arrival. The measured points in time of arrival relate to the time distance of the UWB signals from the different fixed stationary units. In order to allow the mobile tag device to calculate its own position based on a TDoA algorithm, for example, the exact positions of the stationary units are used.

Thus, the herein proposed UWB location systems are further based on well-defined positions of the stationary devices. For implementing an indoor location system, the inventors realized as an objective the need to communicate to the mobile tag devices the position of those stationary devices that are located closely within, e.g. the indoor environment, i.e. within halls or rooms, and represent spatially fixed devices for the localizing algorithm of the UWB signals. (These fixed devices can be considered to operate as equivalents of GPS-satellites of a GPS outdoor location system.) However, the positions of the stationary devices differ from room to room/hall to hall/indoor region to indoor region. Within a tag device centric approach, any self-locating mobile tag device receiving signals from the stationary devices has to know where exactly the respective signal transmitting device is located to be able to use the received signal in its localizing calculations.

To provide the position information, it is proposed herein to use the UWB signals itself. For example, a global (geographical) XYZ position of an emitting stationary unit can be included in, and thus transmitted within, the UWB signal.

For example, a transmitter identification code (transmitter ID, also referred to as a transceiver ID in case the device also receives UWB signals, e.g., for clock synchronization) is usually included in the UWB signal frame. In one implementation, it is proposed herein that the transmitter ID is modified to include the global XYZ position of the respective stationary unit.

As the transmitter ID is transmitted as a part of the UWB signal frame and the positions of the stationary units are by definition spatially unique, in another implementation it is proposed that the mobile tag device is provided with position information about at least those stationary units from which the mobile tag device in principle could receive UWB signals, i.e., which are in the closer surrounding of the tag device (within a room or section of a hall). This approach of providing position information for the transmitter IDs depending on the position of the tag device may not add any additional load to the UWB signal itself, i.e., it does not extend the signal frame. Instead this approach makes the position information available to the localizing algorithms when executed on the mobile tag device itself.

By providing synchronized timestamps and making additionally the positions of the stationary devices available within the UWB signal, the location system can act efficiently because any new mobile tag device automatically (entering, e.g., a room) is enabled to calculate its (own) position without any additional information or any exchange of UWB response signals.

In the herein described implementation, in which the XYZ position is stored together with the transmitter ID within a table in a memory device of the mobile tag device, the localizing procedure can refer to the entry for the transmitter ID in the memory device (once the transmitter ID is received and extracted from the UWB signal) and read the stored XYZ position of the fixed stationary unit stored in the table.

In some embodiments of the location system, a self-synchronized location system as described, for example, in the above-mentioned international patent application PCT/FR2019/000057 may include components such as a master beacon device, beacon satellite devices, optionally beacon repeater devices, and mobile tag devices. The components master beacon device and beacon satellite devices are configured to transmit and/or receive frames such as ultra-wideband RF frames (UWB frames), while the mobile tag devices are configured to receive the frames.

The calibration of clocks of the components, in particular of the master beacon device, the satellite beacon devices, optionally the mobile tag device, and optionally any beacon repeater devices can be performed with successive calibration beacon fames. For an exemplary calibration procedure, it is referred again to the above-mentioned international patent application PCT/FR2019/000057, section "Calibration and calculation units" and respective portions of the detailed description. Using a calibrated clock also at the mobile tag device, arrival timing information can be derived that can be used for the time-difference-of-arrival analysis.

The herein disclosed concepts can provide a very flexible high-performance location system because it is possible to use in a GPS-like but indoor manner, timestamp information together with predefined position information associated with the timestamp information. In some embodiments described herein, the localizing procedure can be implemented without adding further load to the UWB frame of the UWB signals. The herein disclosed concepts allow for a high efficiency when operating the location system and may eliminate the need of doing a set-up task once a new mobile tag device enters a localizing area.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION OF ILLUSTRATIVE EMBODIMENTS

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that, when implementing an indoor real-time location system (RTLS), a flexible transition between rooms/halls/transmitter-specific or transceiver specific areas needs to be considered and enabled. The herein proposed concepts can be implemented in a device centric approach using timestamp synchronization and position information that is made available at the mobile tag device in particular for indoor environments covering a plurality of sub-areas with sub-set of stationary units.

In view of these aspects, a new indoor location system is proposed for flexible localization in particular within complex indoor areas being subject to the location system. The herein proposed UWB protocol is based on employing a UWB frame format having preferably a short size and a UWB location rate frame format that allows an efficient UWB frame communication.

As described in the section "UWB (localizing) protocol" of the above-mentioned international patent application PCT/FR2019/000057, the UWB location rate frame format can define time slots, for example, for the UWB frames emitted from a plurality of UWB signal transmitters such as of a master beacon device and a plurality of beacon satellite devices. (The skilled person will understand that only the beacon section of the time slots is used (or even needed) for the herein disclosed concepts that do not rely on a tag response.) Moreover, that UWB location rate frame format may in particular enable a synchronized timestamping of UWB signals. For example, based on the clock synchronization and preassigned slots, a tag device can further optionally adjust its timing versus a unique timing reference, thereby allowing high precision measurements of the time points of arrival.

Referring to the sections "UWB communication fundamentals" and "UWB frequency range" of the above-mentioned international patent application PCT/FR2019/000057, the herein disclosed concepts relate to UWB signal transmission in the radio frequency range using (e.g. continuously repeated) localizing transmissions of pulsed UWB signals following the UWB protocol. For example, UWB channels can be used in the range from 3 GHz to 10 GHz, e. g., in the ranges from 3.244 GHz to 4.742 GHz or from 5.944 to 10.234 GHz. Exemplary definitions of UWB channels are given in the standard "IEEE Standard 802.15.4-2015—Standard for Low-Rate Wireless Networks" such as channel 1: 3.5 GHz, channel 2: 4 GHz, channel 3: 4.5 GHz, channel 4: 4 GHz 1 GHz bandwidth. Each UWB signal can be emitted according to the UWB frame format. (UWB signals are thus also referred to as UWB frames.) The UWB pulses may have, for example, a broad bandwidth of 1 GHz and low energy −43 dBm/Hz. A single UWB pulse may have a time duration of, for example, 0.3 ns to 10 ns such as 3 ns (e. g. 1 ns at 1 GHz and 2 ns at 500 MHz). The UWB pulses are emitted at a UWB pulse repetition rate. Respective UWB pulse repetition frequencies generally may be in the range from several ten Hertz to several hundred Hertz such as 500 MHz. An exemplary UWB pulse repetition rate is 60 ns or 64 ns or 65 ns, corresponding to a pulse repetition frequency of about 16.666 MHz or 15.625 MHz or 15.385 Hz.

The UWB frame format defines the structure and content of the UWB signal. The UWB frame format may include defined sections such as:

- a synchronization header (SHR) with a preamble and a start frame delimiter (SFD);
- a physical layer header (PHR) with information on the frame length, data rate, and with correction portions such as a cyclic redundancy check (PHR CRC) or a forward error correction (FEC PHR); the physical layer header is used to decode the PHY payload;
- a physical layer (PHY) payload with payload and payload corrections (payload CRC and payload FEC); data embedded in the payload. (See also the detailed description relating to "FIG. 2" of the above-mentioned international patent application PCT/FR2019/000057.)

The data embedded in the payload may include, besides standards entries such as the type of frame, unique information content of the respective UWB signal transmitter/emitter such as globally or locally unique position information and/or an identifier (ID) of the UWB signal transmitter/emitter. The globally or locally unique position information may encode coordinates of the position of a respective UWB signal transmitter, while the coordinates may be given with respect to a global reference or a local reference. In the herein described device centric approach and for UWB signals received by the mobile tag device, the unique information content generally may relate to the master beacon device or a beacon satellite device.

It will be understood that, for the herein disclosed concepts, the start frame delimiter (SFD) can be used to detect time points associated with the reception of a frame with high precision (time points of arrival).

The implementation of the new UWB protocol in a location system, in particular the components of the location system are described in the following. As used anywhere in the present description, any feature described as a "unit" may be embodied, e.g., as discrete physical units, as conceptual functional units, e. g., of software code (an operating program) stored in a storage unit (memory), execute routines by a microprocessor, and/or within a hybrid hardware/firmware structure. For example, "units" disclosed herein are not particularly limited in the present teachings. Furthermore, two or more "units" may be integrated together into a single physical circuit structure (e. g. an integral unit or structure), such as a CPU that is controlled by different sets of programming code (stored instructions) capable of performing the particular functions when executed by a processor, such as a microprocessor or at least a programmable logic device (PLD).

Thus, the "units" referred to in particular in the claims can be implemented as software, hardware, and/or a combination of both hardware and software. The specific details of the particular units are described throughout the specification, and more particularly in the exemplary sections, which provide sufficient information for a person of ordinary skill in the art to identify the corresponding structures, such as hardware circuits or software code segments. Units may comprise one or more PLD such as microprocessors in communication with one or more memories. The memory may store one or more microprocessor-readable instructions (programs) that, when executed by the PLD or microprocessor, perform, for example, the TDoA calculations. Moreover, devices such as the tag device, the master beacon device, or satellite devices may comprise various units that interact with each other to perform the desired actions such as receiving and/or transmitting UWB signals, identifying timing features of the UWB frames, performing clock calibration, etc.

The RTLSs proposed herein comprise components required to perform actions in line with the UWB localizing protocol. In particular, a location system includes components (such as structural units, devices, systems) that emit UWB signals (UWB signal transmitters such as a master beacon device and beacon satellite devices) at positions preset in 3D-space. The location system includes further mobile tag devices that receive the UWB signals and that perform a distance/localizing determination. The stationary devices may emit, receive, or both, i.e., emit and receive (as integrated devices), UWB signals. The UWB signal transmitters are, for example, fixedly mounted to a wall or ceiling or other types of installations being stationary with respect to a to be localized area. Furthermore, during a localizing action a non-moved tag device may act at least temporarily as a stationary UWB signal transmitter, e.g. acting as beacon satellite device if it is capable of transmitting UWB signals and if its position information is communicated within its UWB signal.

Figure 1A:
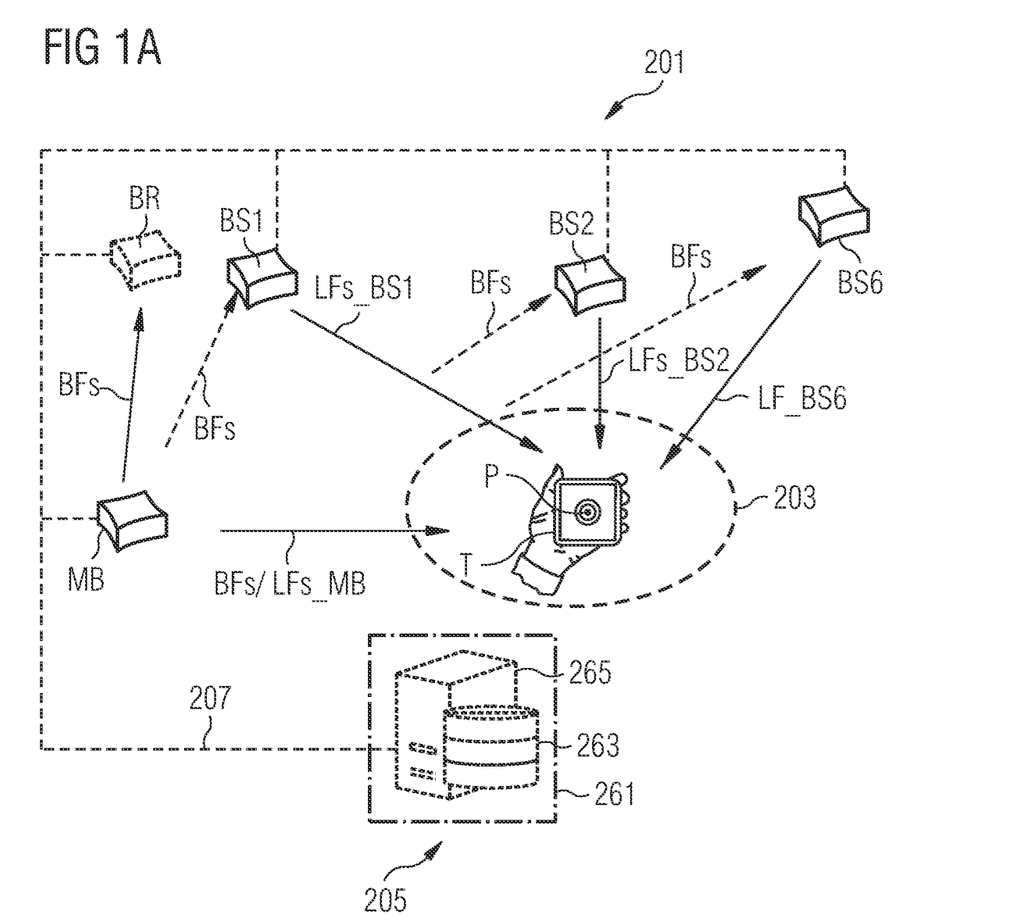
FIG. 1A shows a schematic illustration of a location system for tag device centric localizing.

Referring to FIG. 1A, various components of an (ultra-wideband indoor real-time) location system 201 are shown schematically such as a master beacon device MB, an (exemplary hand held) mobile tag device T, several beacon satellite devices BS1, BS2, BS6, and exemplarily a beacon repeater device BR.

With respect to an exemplary embodiment of UWB signal transmitters, it is referred to the sections "Master beacon device" and those sections describing the technical implementation within the field of a device centric approach of the above-mentioned international patent application PCT/FR2019/000057. With respect to an exemplary embodiment of the mobile tag device, it is referred to the sections "(Mobile) tag devices" and those sections describing the technical implementation within the field of a device centric approach of the above-mentioned international patent application PCT/FR2019/000057 (see e.g., sections "Reception units" and "Calibration and calculation units").

Specifically, a tag device is a unit that is to be located within a location area of the location system. Preferably the tag device is a mobile unit, which means that it is not permanently at the same place, which makes it interesting to localize the same. It may be moved by being attached to or being part of a moving object. The mobile tag device receives UWB signals from a plurality of UWB signal transmitters. The tag device may include a (beacon/signal) reception unit, a tag clock, and a (optionally calibration and) calculation unit including a time detection unit, an identification unit, and a control unit. The tag clock may be realized as a clock-pulse-generator or a clock-wave-generator. The tag clock defines a tag time for each tag. As for the master beacon device, some or all of these elements may be part of a UWB chip. The tag device can receive UWB pulses, specifically the master (or repeater) beacon frames, with the signal reception unit. The signal reception unit may comprise a reception (Rx) antenna. A tag may be placed in a housing, which may also encompass other functionalities such as a smartphone, a computer, a control system of an automated guided vehicle etc., for example.

For the TDoA analysis, the location system has information on the positions of the master beacon device, and the beacon satellite device(s).

In the exemplary embodiment of FIG. 1A, the beacon satellite devices BS1, BS2, BS6 and the beacon repeater device BR may each include a receptor unit, thereby having also the functionality of being synchronizable with the master beacon device MB. It is noted that usually a master beacon device MB or a beacon repeater device BR can be installed within a room or hall, generally a localizing sub-region covered by the location system 201, to ensure temporal synchronization of the transmitted UWB signals.

The tag device T is configured to (continuously and preferably in real time) determine its positions within space, specifically within a location area 203 from the received UWB signals. In the present field of localizing, real time means that position information is available fast enough compared to the speed of movement of a tag device such that the movement can temporally be resolved to a sufficient degree. The location area 203 is defined by the coverage of the UWB signal exchange between the various components.

In the exemplary embodiment of FIG. 1A, the location system 201 further includes a (system) control unit 205 that is connected for data exchange with the master beacon device MB and beacon satellite devices BS1, BS2, BS6, and the beacon repeater device BR. The data connections may be based on cables 207 or may be wireless. Thus, the components may be part of a LAN and/or WLAN network or other communication network(s). The control unit 205 may include a centralized computer system 261 (exemplarily shown in FIG. 1A) or a decentralized computer system with a data storage unit 263 and a calculation unit 265. The data storage unit 263 may store, e.g., the master time delay data mentioned below and the slot information of the satellite devices, e.g. for clock synchronization.

In addition, the UWB signal transmission is schematically illustrated in FIG. 1A. The master beacon device MB and the beacon satellite devices BS1, BS2, BS6 transmit beacon frames BFs/LFs_MB, LFs_LBS1, LFs_LBS2, . . . LF_BS6 that can be received by the tag device T within the location area 203. The tag device T processes the UWB signals for localization. In addition, beacon satellite devices BS1, BS2, BS6 may also receive and process the UWB signals of the master beacon device MB (indicated as beacon frames BFs) for clock calibration (see international patent application PCT/FR2019/000057 for an exemplary calibration approach).

Furthermore, FIG. 1A indicates the concept of using the beacon repeater device BR to extend the range of the location system 201 (in particular the synchronization) e.g. over several rooms. For that purpose, the beacon repeater device BR emits repeater beacon frames that cover an associated area, usually at least one room, in which it may function as a master beacon device, e.g., for calibration.

In the case that a tag device is configured to have sufficient computing power required for performing analysis and calculation of reception time points of master and repeater frames (and provided that the tag device knows the exact location of each beacon transmitter such as the master beacon and the repeater beacons), the tag device—when receiving beacon frames sent at time slots of a predefined beacon section of the location frame format—may determine distance information for the distances between the tag device to the master beacon device and the plurality of beacon satellite devices based on position information of the master beacon device and the plurality of beacon satellite devices. Specifically, based on a plurality of time points of arrival, a time difference-of-arrival analysis can be performed within the mobile tag device.

Figure 1B:
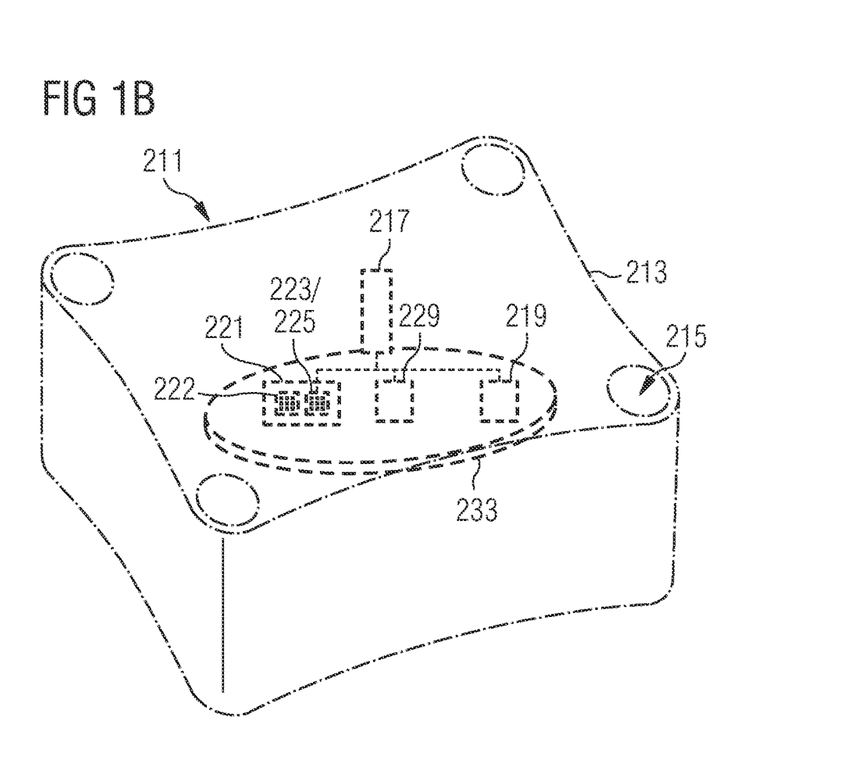
FIG. 1B shows a schematic illustration of a master beacon device or beacon satellite device.

FIG. 1B illustrates schematically an exemplary stationary anchor 211 such as a master beacon device MB or a beacon satellite device BS1, . . . in FIG. 1A. The anchor 211 comprises a housing 213 with, e.g., several through holes 215 for fastening screws to attach the anchor stationary to a wall or ceiling at a spatially fixed position in 3D-space. Within the housing 213, the anchor 211 includes a beacon transmission unit 217 that is configured to perform transmission of localizing beacon frames LFs_MB, LFs_BS1 . . . .

The anchor 211 may further include a master (satellite) clock 219 defining a master (satellite) time. Clock synchronization may be performed based on prior art approaches or in line with the concepts disclosed in international patent application PCT/FR2019/000057. In the latter case, the anchor 211 may further include a master (satellite) storage unit 221 having stored therein its coordinates 222 (locally or globally), and optionally a master time delay data 223, and for the beacon satellite device a satellite time delay data 225 and optionally a calibration and calculation unit 229 for the beacon satellite devices. Some or all of the above components (schematically shown in FIG. 1B) may be integrated at least partly within a common UWB chip and/or may be mounted to a base plate or substrate 233.

Figure 1C:
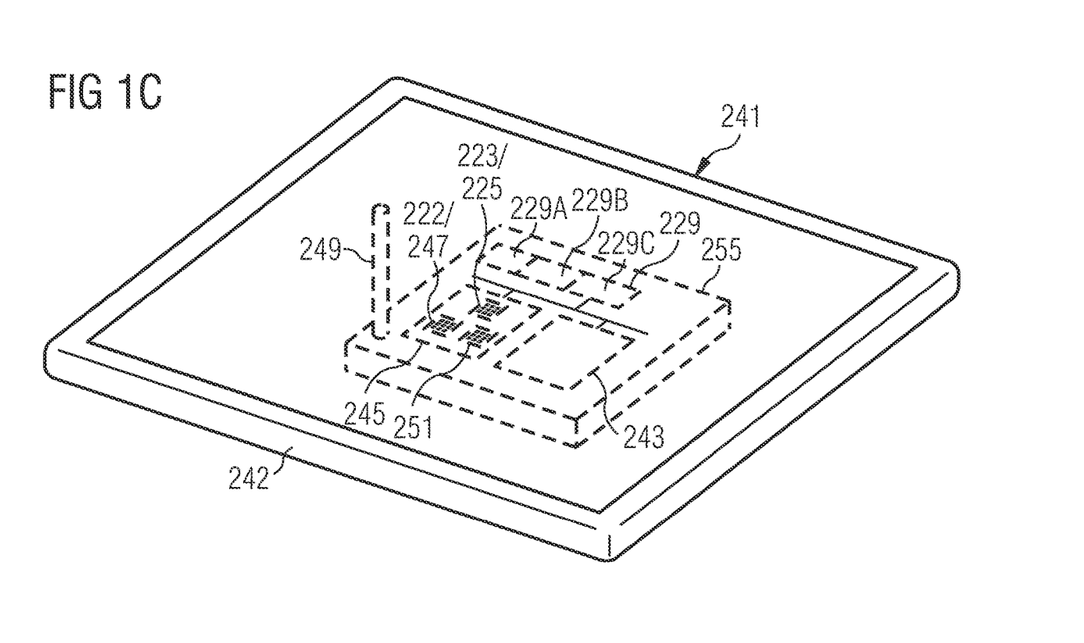
FIG. 1C shows a schematic illustration of a mobile tag device.

FIG. 1C illustrates schematically a mobile tag device 241. The tag device may comprise a housing 242 with a display and an opening, for example, for attaching to some to be located object. Alternatively, the tag device may be integrated in some device such as a self-moving object.

The tag device 241 includes a tag clock 243 defining a tag time that is specific for the respective tag device 241. The tag device 241 further includes a tag data storage unit 245. The tag data storage unit 245 may store therein position data, permanently or after deriving the same from an UWB signal. Within the optionally usable calibration concepts disclosed within the international patent application PCT/FR2019/000057, tag data storage unit 245 may further store the master time delay data 223.

The tag device 241 further includes a reception unit 249 and an (optionally calibration and) calculation unit 229. The reception unit 249 is configured as a UWB frame receiver to receive the beacon frames sent from the master beacon device or a beacon satellite device, thereby measuring respective time points of arrival. The calculation unit 229 may include a time detection unit 229A configured to derive respective arrival time points for the received UWB signals (e.g., generate a tag-specific reception time delay data 251 from the tag beacon time points), an identification unit 229B configured to derive the unique information content from the received UWB signals (e.g. the coordinates 222 (locally or globally)), and a control unit 229C configured to process the unique information content and the arrival time points for at least a subset of UWB signal transmitters in a localizing algorithm to derive the position of the mobile tag device with respect to the subset of the UWB signal transmitters. The above components of a tag device (schematically shown in FIG. 1C) may be integrated at least partly within a common UWB chip and/or may be mounted to a base plate or substrate 255.

With respect to the position data, the data storage unit 245 may store installation position data (such as the coordinates 222) representing the positions of (and optionally also the distances between each of) the plurality of the UWB signal transmitters, specifically the stationary beacon transmission unit 217 of the master beacon device and/or the beacon satellite devices.

Once measured/determined by the control unit 229C, the data storage unit 245 may further receive from the calculation unit 229 time difference-of-arrival periods, and at least temporarily store the same during the calculation.

Figure 2A:
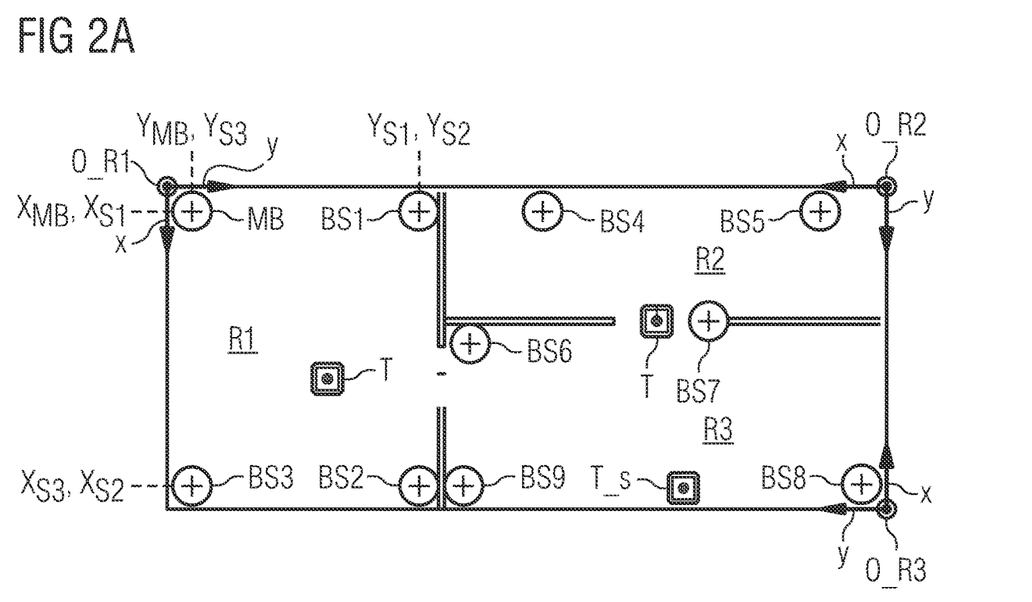
FIG. 2A shows a schematic floor plan of three neighboring rooms illustrating an exemplary installation of stationary units within each of the rooms.
Figure 2B:
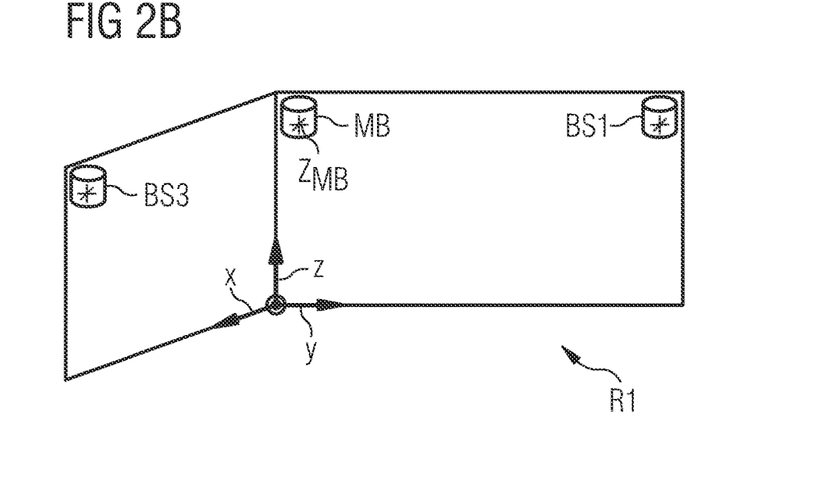
FIG. 2B shows a perspective view onto walls of one of the rooms of the floor plan of FIG. 2A.

Referring again to FIGS. 1A to 1C and additionally to FIGS. 2A and 2B, a localizing approach is described herein that can be operated based on location rate frames for a device centric solution that does not require tag response frames to be emitted. In summary, the installation of an exemplary location system includes a plurality of UWB signal transmitters (e.g., a maser beacon device MB and beacon satellite devices BS1, . . . ). The UWB signal transmitters emit UWB signals (e.g., localizing frames LFs_MB, LFs_BS1 . . . ) that are received by a mobile tag device T. Generally, the UWB signal transmitters can identify themselves within the location system. For example, each UWB signal transmitter may be assigned with a unique identification code (ID). The IDs may be included in the transmitted UWB signals (e.g., the physical layer payload of the UWB frame format) to allow the association of a received UWB signal with the respective UWB signal transmitter.

As indicated in FIGS. 2A and 2B, UWB signal transmitters MB, BS1, . . . BS9 are distributed over a plurality of rooms R1, R2, R3. Preferably, the UWB signal transmitters MB, BS1, . . . integrate the complete room into a localizing area of the location system. For example, the UWB signal transmitters are evenly (or close to evenly) distributed such that the localizing area provided by the location system extends over the required area, including, e.g., corners or potentially UWB signal shadowing regions. The UWB signal transmitters can be installed firmly at a defined position, e.g. at a specific height at a corner of a room as indicated in FIG. 2B for UWB signal transmitters. Exemplary coordinates (XMB, YMB, ZMB; XS1, YS1, . . . ; XS2, YS2, . . . ; XS3, YS3 . . . ) are indicated in FIGS. 2A and 2B.

The position in 2D- and preferably 3D-space of the UWB signal transmitters can be set with respect to a room specific ZERO (reference)-point 0_R1, 0_R2, 0_R3. For example, X-, Y-, and Z-coordinates can be determined with respect to the ZERO-point of the respective room (acting as local origin of a local coordinate system, thus providing local coordinates). Alternatively, global coordinate systems can be used, thus not requiring a local ZERO-point but given with respect to a standard global coordinate system.

The UWB signal transmitters can be connected to a power line to be supplied with power (cables 207 in FIG. 1A can also be considered as or be operated as a powerline). Preferably, the UWB signal transmitters can be further connected to a central server to exchange operational information of the satellite devices. For example, the UWB transmitters can be connected to the central server 205 in FIG. 1A; this connection may not be considered essential for device centric implementations with respect to the localizing algorithm.

Generally, the UWB signal transmitters operate with synchronized clocks. As mentioned above, clock synchronization can be done wireless, via cables such as ethernet, fiber optics, or via specific beacon patterns (beacon-based synchronization) as disclosed in the above-mentioned international patent application PCT/FR2019/000057. A beacon-based synchronization is schematically indicated in the embodiment shown and described in connection with FIG. 1A. Specifically, the beacon satellite devices BS1, BS2, . . . BS6 are operated as transceiver units that not only emit the UWB signals but also receive a specific pattern of beacon frames BFs sent from the master beacon device MB. Based on the pattern of beacon frames BFs, the internal clocks of the beacon satellite devices BS1, BS2, . . . BS6 are synchronized with the internal clock of the master beacon device MB. Similarly, also the tag clock 243 may be synchronized, if needed, e.g. for supporting localization of another tag device while the tag device itself is temporarily stationary.

It will be acknowledged that the beacon frames BFs of the master beacon device may be implemented as the UWB signals, i.e. the localizing frames LFs.

The master beacon device MB and the beacon satellite devices BS1, BS2, . . . BS6 may be operated independently from each other with respect to the emission of the UWB signals or may be associated with respective time slots in a location frame. Time slotting may enable a highly flexible synchronization. The plurality of the beacon satellite devices BS1, BS2, . . . BS6 may be synchronized directly with the master beacon device MB or via a beacon repeater device BR repeating the pattern of beacon frames BFs, e.g., shifted in time to beacon repeater time slots.

The mobile tag device T includes the signal reception unit 249 and time detection unit 229A that are configured to listen to the spatially fixed UWB signal transmitters and to detect the incoming time points of arrival for the plurality of location frames LFs emitted within the localizing area of the location system. Thereby, the arrival time detection is based on the internal tag clock 243 of the mobile tag device T. As mentioned, the internal tag clock 243 may optionally be synchronized with the time of the UWB signal transmitters (i.e. the time of the master beacon device) in some embodiments.

Moreover, the mobile tag device T includes an identification unit 229B that is configured to identify the ID encrypted in the detected UWB signal. Via the identification of the ID, the mobile tag device T can identify also the associated UWB signal transmitter. As an output result of the signal reception unit 249 and the time detection unit 229A, the incoming time points and the associated IDs are provided to a localizing algorithm (executed on a control unit 229C) such as a TDoA algorithm to determine the position of the mobile tag device T.

To perform the localizing algorithm, the mobile tag device T further may include a microcontroller unit as part of the control unit 229C receiving and collecting the information about the incoming time points and the associated IDs, and having the computational power and components to perform the localization process based on the localizing algorithm. For example, the microcontroller unit includes a processor, a short-term memory, and a long-term memory.

The localizing algorithm is based on the positions of the UWB signal transmitters. The respective position may be coded within the ID transmitted with the UWB signal. Alternatively or additionally, it may be deduced from the ID in combination with a data table stored, e.g., in the long term memory. The localizing algorithm calculates the position of the mobile tag device T in 2D- or 3D-space from the positions of the UWB signal transmitters and the associated arrival time points.

The microcontroller unit may store the result, i.e. the position at a respective point in time, or communicate the same to a control system for using the position information in a respective context of, e.g., manufacturing or logistics.

As mentioned above, the ID of the signal UWB transmitter may include the position information or provide access to the position information of the respective UWB signal transmitter.

For example, the ID may consist of a room number for the respective rooms R1, R2, R3, followed by the X-coordinate, then the Y-coordinate then the Z-coordinate of the UWB signal transmitter with respect to a reference point (ZERO-point) associated with the room/room number. For example, the coordinates may be based on increments of 5 cm or 10 cm or 2 cm. Generally, the increments may depend on the precision required or the precision achievable with the location system. The position information coded in this manner within the ID keeps the header small while enabling a localizing space of significant size within which the mobile tag device can be localized.

In another embodiment, the ID is the full global unique position as defined in global maps. The unique position can be given as the coordinates of a geographic coordinate system, where one of the coordinates represents a vertical position and two or three of the coordinates represent a horizontal position (e.g. elevation, latitude, and longitude). Moreover, coordinates of the open-street-map may be used. Although, geographic coordinates may in itself be longer and enlarge the location frame, geographic coordinates may have the advantage that any mobile tag device can in principle be used worldwide within any room equipped with UWB signal transmitters following that standard. Another advantage is the independence of any data storage needed for providing the link between ID and position, or providing the reference position of the reference point.

With respect to the installation procedure of a net of UWB signal transmitters, the same may initially be equipped with a temporary ID. The temporary ID may be based, e.g., on a media access control address (MAC address) associated as a unique identifier to a network interface of the UWB signal transmitter. After installation of the UWB signal transmitter, its position is determined either locally, e.g. with respect to a reference point, or geographically. In a look-up-table 247, the ID can be associated with the determined position. The look-up-table 247 may be used to reassign the ID either within the UWB signal transmitter (i.e. the UWB signal includes the reassigned ID). Alternatively, when performing the signal analysis on board of the mobile tag device, the ID may be replaced by the position entry in the look-up-table 247. In any case, the localizing algorithm can be performed using the position of the UWB signal transmitter.

When the location frame is kept short by maintaining a short ID of the UWB signal transmitter within the UWB signal, the mobile tag device may receive room-specific look-up-tables when entering a room via communication channels based on Wifi, Bluetooth, 5G . . . . The look-up-table 247 may be stored within the tag data storage unit 245 or a storage unit of, e.g., the microprocessor unit or a respective table may be extended with respective new data entries.

As a result of the device centric localization procedure described in connection with FIGS. 1A to 2B, a position P of the tag device T is available at the tag device T itself and may be shown on a display. It will be understood that respective tag devices can be incorporated in various types of mobile devices such as autonomously driving/moving vehicles, drones, and robots.

The tag device T in FIG. 1A receives localizing frames from a sufficient number of transmitting master/beacon repeater devices. E. g., five TDoA-measurements may be sufficient for calculating the position on board the tag device T within the (optionally calibration and) calculation unit 229 shown in FIG. 1C. The (optionally calibration and) calculation unit 229 is configured to measure for the received beacon frames respective temporal shifts with respect to the associated time slots based on the (optionally calibrated) tag time of the calibrated tag clock.

Figure 3A:
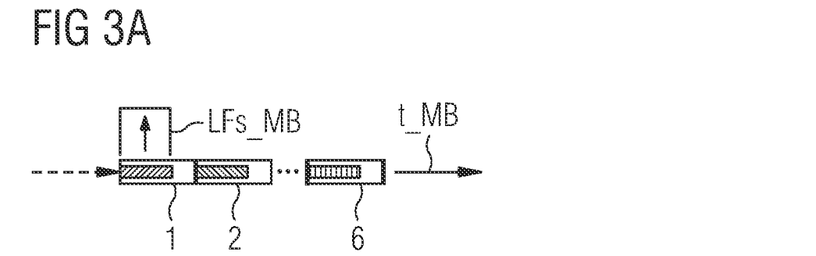
FIGS. 3A to 3C show schematically various actions performed during a tag device centric localizing protocol.
Figure 3B:
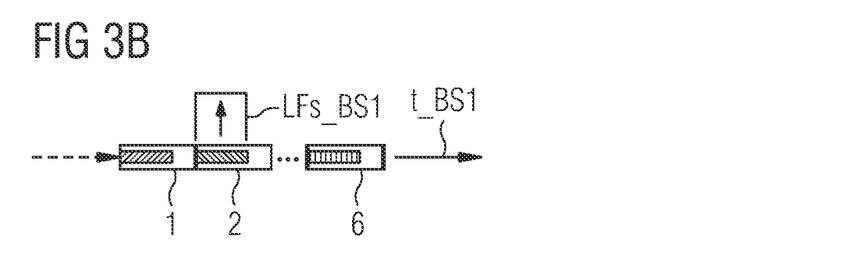

In FIGS. 3A and 3B, the transmission of UWB signals LFs_MB, LFs_BS1 is schematically indicated for the master beacon device MB (FIG. 3A; timeline t_MB) and the beacon satellite device (FIG. 3B; timeline t_BS1). The location frames are indicated within time slots 1, 2, . . . 6 associated within the location frame to the respective UWB transmitters, for example.

Figure 3C:
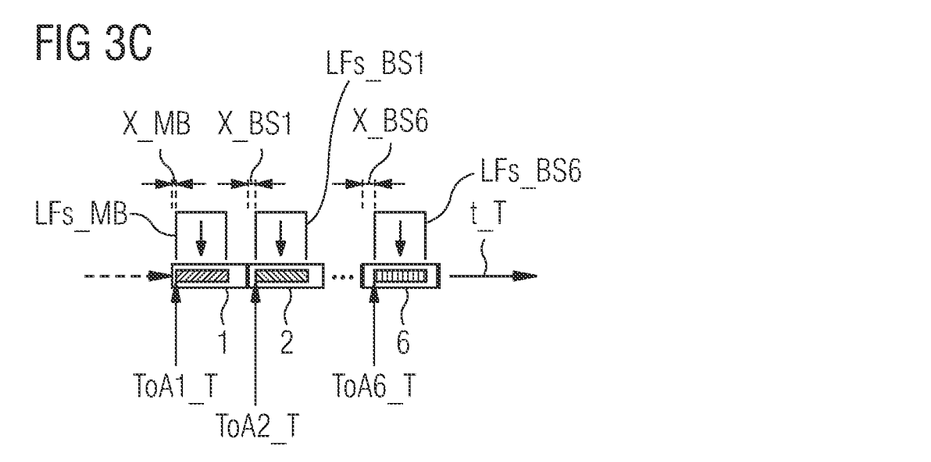

The reception of the UWB signals LFs_MB, LFs_BS1 and LFs_BS6 at the tag device is shown in FIG. 3C (timeline t_T). Exemplarily shifts X_MB, X_BS1, . . . X_BS6 are illustrated within time slots 1 to 6 associated to the location frames received. In FIG. 3C, respective time of arrivals T0A1_T, T0A2_T, . . . T0A6_T as measured at the tag device T are indicated. Based thereon, the time-difference-of-arrival analysis can be performed in the (optionally calibration and) calculation unit 229. The time-difference-of-arrival analysis uses further the knowledge of the exact position of the transmitting master beacon repeater devices (installation position information, i.e. unique information content providing access to the position information of the UWB transmitter). The unique information content accordingly can be stored in the tag data storage unit 245 of the tag device T. If the tag device T, specifically the (optionally calibration and) calculation unit 229, provides sufficient computing power on board, the position can be calculated essentially online with the location rate period, i.e. the repetition rate of the transmission of the location frames LFs.

Thus, the location (position of tag device T) can be computed by applying TDoA position computation. The TDoA-analysis is based on the knowledge of the exact positions of locally fixed transmitter devices (master/satellite beacons, even tag devices that are temporarily fixed in their location) and the measured time-difference-of-arrival of each received beacon frame with respect to the associated time slot. This localizing approach allows fast location determination with a fast refresh rate and a low latency. It is in particular suited for localizing fast moving objects.

As will be understood in light of the tag device centric approach, a location rate frame can be based on the beacon time slots only because there is no need for a tag device to emit a tag response frame. In contrast, a location rate of a location system based on transmitting tag devices can be linked to the number of beacon time slots available for transmission divided by the number of tag devices using the beacon time slots available for transmission. This dependency can be removed for non-emitting tag devices, thereby allowing an increase of the location rate.

As mentioned above, temporarily stationary tag devices can be used for the device centric localization of the tag device T. For example, a tag device T_s illustrated in FIG. 2A in room R3 can be operated as stationary UWB transmitter assuming that it includes also an UWB transmitter unit. If the position of the tag device T_s is known (and stationary) and transmitted to the tag device T, the tag device T_s can be used as a temporarily stationary transmitter device for those time periods where it is (at least temporarily) not changing its position in space. Then (in addition to the time slots associated to the fixedly installed satellite devices), the location rate frame can include time slots that are associable to any transitionally stationary tag device used as (momentarily) stationary beacon satellite device.

Figure 4:
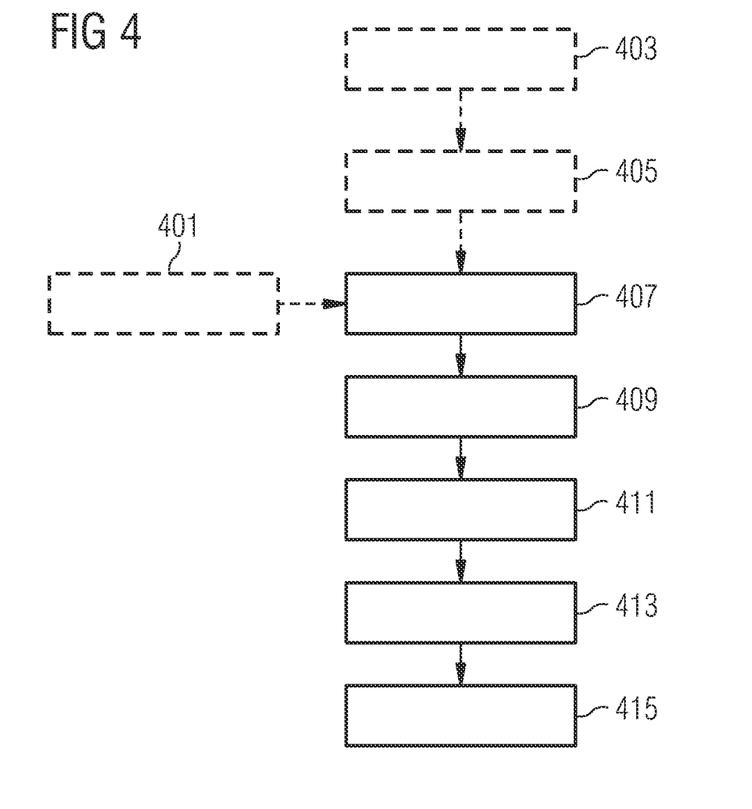
FIG. 4 shows a flowchart of a procedure for self-localization performed at a mobile tag device.

Referring to the flowchart shown in FIG. 4, a method for providing distance values between a tag device and a plurality of tag response receptor units of a RTLS includes the steps:

transmitting (step 407) UWB signals (LFs_ . . . ) using an exchange protocol based on a location rate frame format and a UWB frame format, wherein the location rate frame format includes a beacon section comprising a series of time slots associated to UWB signal transmitters of a plurality of UWB signal transmitters to ensure time synchronized transmission of the UWB signals from the UWB signal transmitters; and the UWB frame format includes an entry with unique information content for the UWB signal transmitter locally/respectively emitting the UWB signals (LFs);

receiving (step 409) the UWB signals (LFs) at mobile tag device (T);

deriving (step 411) respective arrival time points for the received UWB signals;

deriving (step 413) the unique information content from the received UWB signals; and processing (step 415) the unique information content and the arrival time points for at least a subset of the plurality of UWB signal transmitters in a localizing algorithm to derive the position of the mobile tag device (T) with respect to at least the subset of the UWB signal transmitters.

Furthermore, steps may be included such as encoding (step 401) coordinates of the position of the UWB signal transmitter as unique information content in the UWB signal, the coordinates given with respect to a global reference or a local reference; or encoding (step 403) an identifier of the respective UWB signal transmitter as unique information content in the UWB signal, and providing (step 405) a look-up-table (247), the look-up-table (247) associating the encoded identifiers with coordinates (222) of the positions of the UWB signal transmitters given with respect to a global reference or a local reference.

Further aspects relate to a method for providing distance values between a tag device (T2) and a plurality of beacon transmitters including a master beacon device (MB) and a plurality of beacon repeater devices (BR) of a real-time location system, the method comprising:

operating a master beacon device (MB) to transmit successive beacon frames (BFs) whereby there is set a master time delay between two neighboring of the successive beacon frames;

operating the tag device (T) and the beacon repeater devices (BR) to receive the successive beacon frames (BFs) of the master beacon device (MB) and (optionally) to calibrate clocks of the tag device (T) and the beacon repeater devices (BR) using the master time delay (MTD);

operating the beacon repeater devices (BR) to transmit successive beacon frames (BFs_BR) whereby the master time delay is set between two neighboring of the successive beacon frames;

operating the tag device (T) to receive the successive beacon frames (BFs) of the beacon repeater devices (BR), and to determine tag beacon time points (T0A1_T, T0A2_T, . . . ) for the master beacon device (MB) and the beacon repeater devices (BR); and determining the distance values associated to the position of the tag device (T2) from the tag beacon time points (T0A1_T, T0A2_T, . . . ) and installation position data representing the position of the master beacon device (MB) and the plurality of beacon repeater devices (BR).

In further aspects, the method may include the following steps:

transmitting a first beacon frame at a first beacon transmission time point and a second beacon frame at a second beacon transmission time point with a beacon transmission unit of a master beacon device. The time difference between the beacon frames is set because the two successive beacon frames are transmitted with a master time delay corresponding to a master time delay data;

receiving the two successive beacon frames at the tag device;

determining a first tag beacon time point and a second tag beacon time point for the receiving of the two successive beacon frames at the tag device;

generating a tag-specific reception time delay data from the first and second tag beacon time points;

(optionally) calibrating a tag time of the tag device to a master time of the master beacon device by comparing the tag-specific reception time delay data and respective master time delay data;

deriving a tag-specific emission time delay from preset tag-specific emission time delay data for the (optionally calibrated) tag time. The tag-specific emission time delay is associated, for example, with one of the tag beacon time points as a starting point (being a time point associated with the receiving of the two successive beacon frames);

emitting a tag response frame from the tag device after waiting for the tag-specific emission time delay upon the time point associated with the receiving of the two successive beacon frames;

receiving the tag response frames sent from the tag device with, for example, the plurality of tag response receptor units such as within the master beacon device MB and/or the beacon repeater devices;

determining a plurality of receptor response time points for the arrival times of the tag response frame at the respective tag response receptor units, wherein each receptor response time point is specific for the respective tag response receptor unit and the tag device due to the tag-specific emission time delay;

determining path time periods lapsed between a time point associated with the transmitting of the two successive beacon frames and the receptor response time points for the arrival times of the tag response frame at the respective response receptor units;

deriving accumulated time-of-flight periods by subtracting the tag-specific emission time delay of the tag device from the determined path time periods, wherein each accumulated time-of-flight period is associated to a transmission path from the master beacon device to a respective one of the response receptor units via the tag device, determining the distance values associated to the position of the selected tag device from the determined accumulated time-of-flight periods and installation position data that optionally represent the distances between each of the plurality of tag response receptor units and the beacon transmission unit of the master beacon device.

In another aspect, a tag device for a real-time location system configured to be operated with a location protocol, the location protocol optionally applying a location rate frame format as recited in one of the claims and/or aspects disclosed herein, the tag device including:

a tag clock defining a tag time that is specific for the respective tag device;

a tag data storage unit configured to store therein a master time delay data of the real-time location system and position data sets for positions of a master beacon device and a plurality of beacon repeater devices of the real-time location system;

a reception unit configured to
receive beacon frames that were sent in accordance with the location protocol from at least a subgroup of the master beacon device and the beacon repeater devices,
select a pair of beacon frames of the master beacon device or optionally of one of the beacon repeater devices,
determine tag-specific reception time delay data between the beacon frames of the selected pair of beacon frames, and
determine time of arrivals for beacon frames sent from the subgroup of the master beacon device and the beacon repeater devices; and a (optionally calibration and) calculation unit configured to
optionally calibrate the tag clock with respect to the master time by comparing the tag-specific reception time delay data and the master time delay data, and
perform a time-difference-of-arrival analysis using the determined time of arrivals and the position data sets associated with the respective subgroup of the master beacon device and the beacon repeater devices.

In some embodiments, the (optionally calibration and) calculation unit can be further configured to measure, in particular for the received beacon frames of the subgroup of the master beacon device and the beacon repeater devices, respective temporal shifts with respect to the time slot associated the respective master beacon device or beacon repeater device (e. g., a time difference relative to the beginning of the respective time slot) based on the (calibrated) tag time of the calibrated tag clock.

In some embodiments, the tag device can be further configured to include in the time-difference-of-arrival analysis a time of arrival for a tag response frame received with the reception unit and sent by another tag device, for which the tag device received and stored in the tag data storage unit a position data set indicating a temporarily stationary position for that another tag device.

Although the preferred embodiments of this invention have been described herein, improvements and modifications may be incorporated without departing from the scope of the following claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An ultra-wideband indoor real-time location system comprising:
a plurality of UWB signal transmitters located at preset positions and defining a localizing area, wherein the UWB signal transmitters are configured to operate with synchronized clocks and transmit UWB signals based on a UWB frame format, and wherein the UWB frame format includes an entry of unique information content of a respective UWB signal transmitter; and at least one mobile tag device comprising:
a signal reception unit configured to receive the UWB signals;
a time detection unit configured to derive respective arrival time points for the received UWB signals;
an identification unit configured to derive the unique information content from the received UWB signals; and
a control unit configured to process the unique information content and the arrival time points for at least a subset of the UWB signal transmitters in a localizing algorithm to derive a position of the mobile tag device with respect to the subset of the UWB signal transmitters.

2. The ultra-wideband indoor real-time location system of claim 1, wherein the control unit is further configured to:
identify the positions of the UWB signal transmitters based on the unique information content, the unique information content including globally or locally unique position information and optionally encoding coordinates of the position of the respective UWB signal transmitter, wherein the coordinates are provided with respect to a global reference or a local reference, and
provide the positions of the UWB signal transmitters as input values to the localizing algorithm.

3. The ultra-wideband indoor real-time location system of claim 2, wherein, for a subset of UWB signal transmitters, the coordinates are encoded with respect to the same global reference or the same local reference.

4. The ultra-wideband indoor real-time location system of claim 2, wherein the control unit is configured to have access to the local reference that is stored at a local memory of the mobile tag device and/or that is provided within the ultra-wideband indoor real-time location system to the mobile tag device when the mobile tag device enters a portion of a building.

5. The ultra-wideband indoor real-time location system of claim 4, wherein the local reference identifies a room and optionally is provided in global coordinates.

6. The ultra-wideband indoor real-time location system of claim 1, wherein the control unit is further configured to:
identify the positions of the UWB signal transmitters based on the unique information content, the unique information content encoding an identifier of the respective UWB signal transmitter, and based on a look-up-table the look-up-table associating the encoded identifiers with coordinates of the positions of the UWB signal transmitters given with respect to a global reference or a local reference, and
provide the positions of the UWB signal transmitters as input values to the localizing algorithm.

7. The ultra-wideband indoor real-time location system of claim 6, wherein, for a subset of UWB signal transmitters, the coordinates are encoded with respect to the same global reference or the same local reference.

8. The ultra-wideband indoor real-time location system of claim 6, wherein the control unit is configured to have access to the local reference that is stored at a local memory of the mobile tag device and/or that is provided within the ultra-wideband indoor real-time location system to the mobile tag device when the mobile tag device enters a portion of a building.

9. The ultra-wideband indoor real-time location system of claim 8, wherein the local reference identifies a room and optionally is provided in global coordinates.

10. The ultra-wideband indoor real-time location system of claim 1, wherein the UWB signal transmitters are configured to transmit the UWB signals at respective emission time points that are temporally preset with respect to each other and/or wherein timestamp information is encoded within each UWB signal and represents a global time point of transmission.

11. The ultra-wideband indoor real-time location system of claim 1, wherein the UWB signal transmitters include a master beacon device and a plurality of beacon satellite devices, wherein clocks of the beacon satellite devices are synchronized based on emissions of beacon frames emitted by the master beacon device with a master time delay between two successive beacon frames.

12. The ultra-wideband indoor real-time location system of claim 11,
wherein the beacon satellite devices are configured to transmit successive beacon frames,
wherein the master time delay is set between two neighboring of the successive beacon frames,
wherein the mobile tag device is configured to:
receive the successive beacon frames of the beacon satellite devices, and
determine the arrival time points for the frames emitted from the master beacon device and the beacon satellite devices, and
wherein the control unit is configured to determine distance values associated to the position of the mobile tag device from the arrival time points and installation position data representing a position of the master beacon device and the plurality of beacon satellite devices.

13. The ultra-wideband indoor real-time location system of claim 1,
wherein the mobile tag device further comprises:
a tag clock defining a tag time specific for the respective mobile tag device, and
a tag data storage unit configured to store master time delay data of the real-time location system and position data sets for positions of a master beacon device and a plurality of beacon satellite devices of the real-time location system,
wherein the signal reception unit of the mobile tag device is further configured to:
receive beacon frames sent in accordance with a location protocol from at least a subgroup of the master beacon device and the beacon satellite devices,
select a pair of beacon frames of the master beacon device or optionally of one of the beacon satellite devices,
determine tag-specific reception time delay data between the beacon frames of the selected pair of beacon frames, and
determine time of arrivals for location frames sent from the subgroup of the master beacon device and the beacon satellite devices, and
wherein the control unit of the tag device is further configured to:
optionally calibrate the tag clock with respect to a master time by comparing the tag-specific reception time delay data and the master time delay data, and
perform a time-difference-of-arrival analysis using the determined time of arrivals and the position data sets associated with the respective subgroup of the master beacon device and the beacon satellite devices.

14. The ultra-wideband indoor real-time location system of claim 13, wherein the control unit of the mobile tag device is further configured to measure respective temporal shifts with respect to a time slot associated the respective master beacon device or the beacon satellite devices based on the calibrated tag time of the calibrated tag clock.

15. The ultra-wideband indoor real-time location system of claim 14, wherein the mobile tag device is further configured to include in the time-difference-of-arrival analysis a time of arrival for a tag location frame sent by another mobile tag device, for which the tag mobile device received and stored in the tag data storage unit a position data set indicating a temporarily stationary position.

16. A real-time location method comprising:
    transmitting UWB signals using an exchange protocol based on a location rate frame format and a UWB frame format,
    wherein the location rate frame format includes a beacon section comprising a series of time slots associated to UWB signal transmitters of a plurality of UWB signal transmitters to ensure time synchronized transmission of the UWB signals from the UWB signal transmitters, and
    wherein the UWB frame format includes an entry with unique information content of a respective UWB signal transmitter emitting a UWB signal;
    receiving the UWB signals at a mobile tag device;
    deriving respective arrival time points for the received UWB signals at the mobile tag device;
    deriving the unique information content from the received UWB signals; and
    processing the unique information content and the arrival time points for at least a subset of the plurality of UWB signal transmitters in a localizing algorithm to derive a position of the mobile tag device with respect to at least the subset of the UWB signal transmitters.

17. The method of claim 16, further comprising encoding coordinates of a position of a respective the UWB signal transmitter as the unique information content in the UWB signal, the coordinates provided with respect to a global reference or a local reference.

18. The method of claim 16, further comprising:
    encoding an identifier of the respective UWB signal transmitter as the unique information content in the UWB signal; and
    providing a look-up-table, the look-up-table associating the encoded identifiers with coordinates of the positions of the UWB signal transmitters provided with respect to a global reference or a local reference.

19. The method of claim 18, wherein, for a subset of UWB signal transmitters, the coordinates are encoded with respect to a common global reference or a common local reference.

20. The method of claim 19, wherein the unique information content is selected for calculating time difference of arrival values under consideration of a point of origin of a received UWB signal.

* * * * *